(12) United States Patent
Mishra et al.

(10) Patent No.: US 11,179,919 B2
(45) Date of Patent: Nov. 23, 2021

(54) MULTILAYER STRUCTURE, A METHOD OF PRODUCING THE SAME, AND A PACKAGING COMPRISING THE SAME

(71) Applicant: Dow Global Technologies LLC, Midland, MI (US)

(72) Inventors: Shashibhushan Mishra, Thane (IN); Prajwal Shah, Navi Mumbai (IN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/532,585

(22) PCT Filed: Dec. 14, 2015

(86) PCT No.: PCT/US2015/065485
§ 371 (c)(1),
(2) Date: Jun. 2, 2017

(87) PCT Pub. No.: WO2016/100176
PCT Pub. Date: Jun. 23, 2016

(65) Prior Publication Data
US 2017/0326847 A1 Nov. 16, 2017

(30) Foreign Application Priority Data

Dec. 19, 2014 (IN) .......................... 6403/CHE/2014

(51) Int. Cl.
*B32B 27/08* (2006.01)
*B32B 27/32* (2006.01)
(Continued)

(52) U.S. Cl.
CPC ................ *B32B 27/08* (2013.01); *B32B 7/02* (2013.01); *B32B 27/32* (2013.01); *B32B 27/34* (2013.01);
(Continued)

(58) Field of Classification Search
CPC ........... B32B 27/08; B32B 7/02; B32B 27/34; B32B 27/32; B32B 27/36; B32B 2553/00;
(Continued)

(56) References Cited

U.S. PATENT DOCUMENTS 5,209,972 A * 5/1993 Super .................. B32B 27/08
428/349
5,582,923 A * 12/1996 Kale .................... B32B 27/08
428/523

(Continued)

FOREIGN PATENT DOCUMENTS

CN 1169744 1/1998
CN 2671993 1/2005
(Continued)

OTHER PUBLICATIONS

International Search Report and Written Opinion for related PCT Application PCT/US2015/065485, dated Mar. 22, 2016 (10 pgs).

(Continued)

*Primary Examiner* — John D Freeman
(74) *Attorney, Agent, or Firm* — Brooks, Cameron & Huebsch, PLLC

(57) ABSTRACT

A multilayer structure comprising a sealant layer which comprises (a) a blend comprising (i) from 80 to 95 percent by weight of at least one ethylene/α-olefin interpolymer composition which comprises a homogeneously branched linear ethylene polymer composition and a heterogeneously branched linear ethylene polymer composition and (ii) from 5 to 20 percent by weight of at least one high pressure ethylene polymer characterized as having a melt index, $I_2$ less than 6.0 g/10 minutes, a density of at least 0.916 g/cc, a Mw/Mn ratio of at least 7.0, wherein the blend has a melt index, $I_2$, of at least 1.0 g/10 minutes; and (b) a low density polyethylene composition which comprises at least two components selected from the group consisting of homoge- (Continued)

| Oriented Polymer |
| :---: |
| (for example, oriented polyethylene terephthalate (Reverse Printed)) |
| Primer |
| Extrusion Lamination |
| Barrier Layer |
| (for example, metalized polyester) |
| Adhesive |
| Low Density Polyethylene |
| Extrusion Coated Sealant Layer | neously and heterogeneously branched linear ethylene polymers, wherein the composition has density from 0.90 to 0.930 g/cc and an $I_2$ of from 1 to 50 g/10 minutes is provided.

9 Claims, 1 Drawing Sheet

(51) Int. Cl.
*B32B 27/34* (2006.01)
*B32B 27/36* (2006.01)
*C08L 23/08* (2006.01)
*B32B 7/02* (2019.01)

(52) U.S. Cl.
CPC .......... *B32B 27/36* (2013.01); *C08L 23/0815* (2013.01); *B32B 2250/24* (2013.01); *B32B 2270/00* (2013.01); *B32B 2307/30* (2013.01); *B32B 2307/31* (2013.01); *B32B 2307/718* (2013.01); *B32B 2307/7244* (2013.01); *B32B 2307/746* (2013.01); *B32B 2439/70* (2013.01); *B32B 2553/00* (2013.01); *C08L 2205/02* (2013.01); *C08L 2205/025* (2013.01); *C08L 2205/03* (2013.01); *C08L 2207/066* (2013.01)

(58) Field of Classification Search
CPC .......... B32B 2307/30; B32B 2307/746; B32B 2250/24; B32B 2270/00; B32B 2307/31; B32B 2307/718; B32B 2307/7244; B32B 2439/70; C08L 23/0815; C08L 2205/03; C08L 2207/066; C08L 2205/025; C08L 2205/02; C08L 23/04; C08L 23/08; B29C 48/18; C08J 5/18
See application file for complete search history.

(56) References Cited

U.S. PATENT DOCUMENTS

| | | |
|---|---|---|
| 5,874,139 A | 2/1999 | Bosiers et al. |
| 6,094,889 A | 8/2000 | Van Loon et al. |
| 6,503,637 B1 | 1/2003 | Van Loon |
| 6,696,520 B1 | 2/2004 | Pellegatti et al. |
| 7,341,793 B2 | 3/2008 | Ishii et al. |
| 8,791,205 B2 | 7/2014 | Michie, Jr. et al. |
| 8,916,647 B2 | 12/2014 | Zuercher et al. |
| 2002/0006482 A1 | 1/2002 | Falla et al. |
| 2010/0015423 A1* | 1/2010 | Schaefer ................ B32B 27/18 428/216 |
| 2010/0310890 A1 | 12/2010 | Takeishi et al. |
| 2011/0185683 A1 | 8/2011 | Domenech et al. |
| 2013/0337244 A1* | 12/2013 | Stanley ................ B65D 85/00 428/212 |
| 2014/0147646 A1 | 5/2014 | Chen et al. |
| 2015/0140304 A1 | 5/2015 | Manrique et al. |

FOREIGN PATENT DOCUMENTS

| | | |
|---|---|---|
| EP | 0956947 | 11/1999 |
| JP | 2004114515 | 4/2004 |
| JP | 2005319583 | 11/2005 |
| WO | 96/16119 | 5/1996 |
| WO | 98/37140 | 8/1998 |

OTHER PUBLICATIONS

International Preliminary Report on Patentability for related PCT Application PCT/US2015/065485, dated Jun. 29, 2017 (6 pgs).

* cited by examiner

| |
|---|
| Oriented Polymer (for example, oriented polyethylene terephthalate (Reverse Printed)) |
| Primer |
| Extrusion Lamination |
| Barrier Layer (for example, metalized polyester) |
| Adhesive |
| Blown Polyethylene film Sealant |

FIG. 1

| |
|---|
| Oriented Polymer (for example, oriented polyethylene terephthalate (Reverse Printed)) |
| Primer |
| Extrusion Lamination |
| Barrier Layer (for example, metalized polyester) |
| Adhesive |
| Low Density Polyethylene |
| Extrusion Coated Sealant Layer |

FIG. 2

MULTILAYER STRUCTURE, A METHOD OF PRODUCING THE SAME, AND A PACKAGING COMPRISING THE SAME

This application is a National Stage Application under 35 U.S.C. § 371 of International Application Number PCT/US2015/065485, filed Dec. 14, 2015 and published as WO 2016/100176 on Jun. 23, 2016, which claims the benefit to Indian Application Number 6403/CHE/2014, filed Dec. 19, 2014, the entire contents of which are incorporated herein by reference in its entirety.

FIELD OF INVENTION

The disclosure relates to a multilayer structure, a method of producing a multilayer structure and a packaging comprising the multilayer structure.

BACKGROUND OF THE INVENTION

Snack food packaging, particularly packaging for vegetable and/or potato chips, are made from multilayer laminate structures having a thin film of about 18-20 microns and highly rich in metallocene linear low density polyethylene (mLLDPE) as a sealant layer. This market segment is dominated by mLLDPE resins for sealing properties as well as high abuse performance requirements. FIG. 1 illustrates an exemplary multilayer laminate structure which is currently used in snack food packaging. As seen in FIG. 1, such multilayer structures typically include an oriented polymer layer which may be printed, a primer layer, an extrusion lamination layer, a barrier layer, an adhesive layer and a blown polyethylene-based polymer sealant. Multilayer laminate structures made by an extrusion coating route having good sealing properties, sufficient hot tack, seal strength and faster VFFS performance would be desirable.

SUMMARY OF THE INVENTION

The disclosure is for a multilayer structure, a method of producing a multilayer structure and a packaging comprising the multilayer structure.

In one embodiment, the disclosure provides a multilayer structure comprising: a sealant layer which comprises (a) a blend comprising (i) from 80 to 95 percent by weight of at least one ethylene/α-olefin interpolymer composition which comprises a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and (ii) from 5 to 20 percent by weight of at least one high pressure ethylene polymer characterized as having a melt index, $I_2$ less than 6.0 g/10 minutes, a density of at least 0.916 g/cc, a Mw/Mn ratio of at least 7.0 and a bimodal molecular weight distribution as determined by gel permeation chromatography, wherein the blend has a melt index, $I_2$, of at least 1.0 g/10 minutes; and (b) a linear low density polyethylene composition which comprises at least two components selected from the group consisting of homogeneously and heterogeneously branched linear ethylene polymers, wherein the composition has a density from 0.86 to 0.940 g/cc and an $I_2$ of from 0.5 to 50 g/10 minutes.

BRIEF DESCRIPTION OF THE DRAWINGS

FIG. 1 is a schematic illustrating a multilayer structure currently used in snack food packaging; and FIG. 2 is a schematic illustrating a first embodiment of the inventive multilayer structure.

DETAILED DESCRIPTION OF THE INVENTION

The disclosure provides a multilayer structure, a method of producing a multilayer structure and a packaging comprising the multilayer structure.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

"Polyolefin" means a polymer which comprises greater than 50 wt % units derived from one or more olefinic monomers, for example ethylene or propylene (based on weight of the polymer) and, optionally, may contain at least one comonomer.

"Polyethylene" or PE means a polymer having greater than 50 wt % units derived from ethylene monomer.

"Low density polyethylene" or LDPE means a polyethylene having a density equal to or less than 0.930 g/cc.

"Linear low density polyethylene" or LLDPE means a low density polyethylene in which the polymer backbone lacks measurable or demonstrable long chain branches, for example, the polymer is substituted with an average of less than 0.01 long branch per 1000 carbons.

"Polypropylene" or PP means a polymer having greater than 50 wt % units derived from propylene monomer.

In one embodiment, the disclosure provides a multilayer structure comprising: a sealant layer which comprises (a) a blend comprising (i) from 80 to 95 percent by weight of at least one ethylene/α-olefin interpolymer composition which comprises a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and (ii) from 5 to 20 percent by weight of at least one high pressure ethylene polymer characterized as having a melt index, $I_2$ less than 6.0 g/10 minutes, a density of at least 0.916 g/cc, a Mw/Mn ratio of at least 7.0 and a bimodal molecular weight distribution as determined by gel permeation chromatography, wherein the blend has a melt index, $I_2$, of at least 1.0 g/10 minutes; and (b) a linear low density polyethylene composition which comprises at least two components selected from the group consisting of homogeneously and heterogeneously branched linear ethylene polymers, wherein the composition has a density from 0.86 to 0.940 g/cc and an $I_2$ of from 0.5 to 50 g/10 minutes.

In a second embodiment, the disclosure provides a method for preparing a multilayer structure comprising: extrusion coating a coextruded sealant layer onto a two-ply laminate, wherein the coextruded sealant layer comprises (a) a blend comprising (i) from 80 to 95 percent by weight of at least one ethylene/α-olefin interpolymer composition selected from the group consisting of a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and (ii) from 5 to 20 percent by weight of at least one high pressure ethylene polymer characterized as having a melt index, $I_2$ less than 6.0 g/10 minutes, a density of at least 0.916 g/cc, a Mw/Mn ratio of at least 7.0 and a bimodal molecular weight distribution as determined by gel permeation chromatography, wherein the blend has a melt index, $I_2$, of at least 1.0 g/10 minutes; and (b) a linear low density polyethylene having a density from 0.86 to 0.940 g/cc and an $I_2$ of from 0.5 to 50 g/10 minutes; wherein the blend is present in an amount from 8 to 30 gsm.

In a third embodiment, the disclosure provides a packaging which comprises any embodiment of the multilayer structure disclosed herein.

The blend comprises from 80 to 95 percent by weight (wt %) of at least one ethylene/α-olefin interpolymer composition which comprises a homogeneously branched linear ethylene polymer composition and a heterogeneously branched linear ethylene polymer composition, wherein the ethylene/α-olefin interpolymer is characterized as having a density in the range of 0.85 g/cc to 0.940 g/cc. All individual values and subranges from 80 to 95 wt % are included and disclosed herein; for example the amount of the at least one ethylene/α-olefin interpolymer composition can range from a lower limit of 80, 83, 86, 89, 92, or 94 wt % to an upper limit of 81, 84, 87, 90, 93 or 95 wt %. The amount of the at least one ethylene/α-olefin interpolymer composition can be from 80 to 95 wt %, or in the alternative, from 80 to 88 wt %, or in the alternative, from 87 to 95 wt %, or in the alternative, from 84 to 91 wt %. All individual values and subranges from 0.85 to 0.94 g/cc are included and disclosed herein; for example, the density can range from a lower limit of 0.85, 0.88, 0.91 or 0.93 g/cc to an upper limit of 0.86, 0.89, 0.92, or 0.94 g/cc.

Polymer blends useful in the sealant layer may be obtained by the methods described in and are further detailed in U.S. Pat. No. 5,582,923, the disclosure of which is incorporated herein by reference.

The blend comprises from 5 to 20 percent by weight of at least one high pressure ethylene polymer characterized as having a melt index, $I_2$ less than 6.0 g/10 minutes, a density of at least 0.916 g/cc, a Mw/Mn ratio of at least 7.0 and a bimodal molecular weight distribution as determined by gel permeation chromatography. All individual values and subranges from 5 to 20 wt % are included and disclosed herein; for example, the amount of at least one high pressure ethylene polymer in the blend can range from a lower limit of 5, 8, 11, 14, 17 or 19 wt % to an upper limit of 7, 10, 13, 16, 19 or 20 wt %. For example, the amount of at least one high pressure ethylene polymer fin the polymer blend can be from 5 to 20 wt %, or in the alternative, from 5 to 13 wt %, or in the alternative, from 14 to 20 wt %, or in the alternative, from 8 to 17 wt %. The at least one high pressure ethylene polymer has a melt index, $I_2$ less than 6.0 g/10 minutes. All individual values and subranges from less than 6.0 g/10 min. are included and disclosed herein. For example, the $I_2$ can be less than 6.0 g/10 minutes, or in the alternative, less than 5.50 g/10 minutes, or in the alternative, less than 4.0 g/10 minutes, or in the alternative, less than 2.5 g/10 minutes. The at least one high pressure ethylene polymer has a density of at least 0.916 g/cc. All individual values and subranges from at least 0.91 g/cc are included and disclosed herein. For example, the density of the at least one high pressure ethylene polymer can be at least 0.916 g/cc, or in the alternative, at least 0.925 g/cc, or in the alternative, at least 0.930 g/cc, or in the alternative, at least 0.940 g/cc. The at least one high pressure ethylene polymer has a Mw/Mn ratio of at least 7.0. All individual values and subranges from at least 7.0 are included and disclosed herein. For example, the Mw/Mn can be at least 7.0, or in the alternative, at least 8.0, or in the alternative, at least 9.0.

The blend has a melt index, $I_2$, of at least 1.0 g/10 minutes. All individual values and subranges from at least 1.0 g/10 min are included and disclosed herein. For example, the $I_2$ min of the blend can be at least 1.0 g/10 min, or in the alternative, at least 10.0 g/10 min, or in the alternative, at least 20.0 g/10 min.

The sealant layer also comprises a linear low density polyethylene composition which comprises at least two components selected from the group consisting of homogeneously and heterogeneously branched linear ethylene polymers, wherein the composition has a density from 0.86 to 0.940 g/cc and an $I_2$ of from 0.5 to 50 g/10 minutes. The linear low density polyethylene composition has a density from 0.86 to 0.940 g/cc. All individual values and subranges from 0.86 to 0.940 g/cc are included and disclosed herein; for example, the density of the low density polyethylene composition can range from a lower limit of 0.86, 0.87, 0.88, 0.89, 0.90, 0.910, 0.920, 0.930 or 0.935 g/cc to an upper limit of 0.865, 0.875, 0.885, 0.895, 0.915, 0.925, 0.935 or 0.940 g/cc. For example, the density of the low density polyethylene composition can be from 0.86 to 0.940 g/cc, or in the alternative, from 0.86 to 0.915 g/cc, or in the alternative, from 0.916 to 0.940 g/cc, or in the alternative, from 0.910 to 0.920 g/cc. The low density polyethylene composition has an $I_2$ of from 0.5 to 50 g/10 minutes. All individual values and subranges from 0.5 to 50 g/10 min. are included and disclosed herein; for example, the $I_2$ can range from a lower limit of 0.5, 1, 10, 20, 30 or 40 g/10 min to an upper limit of 0.9, 5, 15, 25, 35, 45 or 50 g/10 min. For example, the $I_2$ can be from 0.5 to 50 g/10 min, or in the alternative, from 0.5 to 26 g/10 min, or in the alternative, from 24 to 50 g/10 min, or in the alternative, from 15 to 35 g/10 min.

Exemplary linear low density polyethylene compositions include those available under the name ELITE from The Dow Chemical Company (Midland, Mich., USA).

In the method to produce a multilayer structure disclosed herein, any two-ply laminate may be used. Components of the two ply laminate may include, but are not limited to polyesters, biaxially oriented polypropylene, oriented polyamides.

In the method to produce a multilayer structure disclosed herein, the blend is present in an amount from 8 to 30 gsm and the low density polyethylene is present in an amount from 5 to 15 gsm. All individual values and subranges from 8 to 30 gsm are included and disclosed herein; for example, the amount of the blend may range from a lower limit of 8, 10, 15, 20 or 25 gsm to an upper limit of 10, 12, 17, 23, 28 or 30 gsm. For example, the coating weight of the blend may be from 10 to 30 gsm, or in the alternative, from 10 to 20 gsm, or in the alternative, from 20 to 30 gsm, or in the alternative, from 15 to 25 gsm. Likewise, all individual values and subranges from 5 to 15 gsm are included and disclosed herein; for example, the coating weight of the low density polyethylene may range from a lower limit of 5, 8, 11, or 14 gsm to an upper limit of 6, 9, 12 or 15 gsm. For example, the coating weight of the low density polyethylene can be from 5 to 15 gsm, or in the alternative, from 5 to 10 gsm, or in the alternative, from 10 to 15 gsm, or in the alternative, from 7 to 13 gsm.

The disclosure further provides the multilayer structure, method and packaging according to any embodiment disclosed herein; except that the sealant layer has a coating weight of at least 8 gsm. All individual values and subranges from at least 8 gsm are included and disclosed herein. For example, the coating weight of the sealant layer can be from a lower limit of 8, 10, 12, or 14 gsm. In a particular embodiment, the coating weight of the sealant layer is less than or equal to 40 gsm. All individual values and subranges from less than or equal to 40 gsm are included and disclosed herein; for example, the coating weight of the sealant layer can be from an upper limit of up to 40, 30, 25 or 20 gsm.

The disclosure further provides the multilayer structure, method and packaging according to any embodiment disclosed herein; except that the sealant layer is extrusion coated.

The disclosure further provides the multilayer structure, method and packaging according to any embodiment disclosed herein; except that the sealant layer is coextruded.

The disclosure further provides the multilayer structure, method and packaging according to any embodiment disclosed herein; except that the blend further comprises a slip agent. Any slip agent may be added to the blend. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof.

The disclosure further provides the multilayer structure, method and packaging according to any embodiment disclosed herein; except that the multilayer structure further comprises an oriented polymer layer selected from the group consisting of oriented polyolefin, oriented polyethylene terephthalate (PET), and oriented polyamide.

The disclosure further provides the multilayer structure, method and packaging according to any embodiment disclosed herein; except that the multilayer structure further comprises a barrier layer. Any appropriate barrier layer may be used. Non-limiting examples of barrier layers include metallized polyester, metallized PET, ethylene vinyl alcohol polymer (EVOH), polyvinylidenechloride (PVDC), metallized oriented polyamide (OPA), metallized oriented polypropylene (OPP), metallized polyethylene, or any combination thereof.

The disclosure further provides the multilayer structure, method and packaging according to any embodiment disclosed herein; except that the multilayer structure further comprises an oriented polymer layer selected from the group consisting of oriented polyolefin, oriented PET, and oriented polyamide; a barrier layer; an extrusion laminate; optionally, a first primer between the oriented polyolefin layer and the extrusion laminate; and optionally, a second primer between the barrier layer and the coextruded sealant layer and wherein the barrier layer is adjacent to the extrusion laminate. The extrusion laminate may comprise extrusion coated polyolefin.

The disclosure further provides the multilayer structure, method and packaging according to any embodiment disclosed herein; except that, if the sealant layer is coated at a 8 gsm coating weight, the sealant layer exhibits at least one of the following properties: a hot tack strength of at least 3 N/25 mm and a seal strength of at least 20 N/25 mm. A skilled artisan would understand that the values for hot tack strength and seal strength will depend upon the thickness or coating weight of the sealant layer. Thus, the sealant layer is such that a coating weight of 8 gsm would result in at least one of the properties: a hot tack strength of at least 3 N/25 mm and a seal strength of at least 20 N/25 mm. All individual values and subranges of a hot tack strength from at least 3 N/25 mm are included and disclosed herein; for example, the hot tack strength can be at least 3, 4, or 5 N/25 mm. All individual values and subranges of a seal strength from at least 20 N/25 mm are included and disclosed herein; for example, the seal strength can be at least 20, 25, or 30 N/25 mm.

The disclosure further provides the multilayer structure, method and packaging according to any embodiment disclosed herein; except that the melt temperature of the sealant layer is lower than the melt temperature of the LDPE layer. In a particular embodiment, the melt temperature of the sealant layer is at least 10° C. less than the melt temperature of the LDPE layer. All individual values and subranges from at least 10° C. are included and disclosed herein. For example, the melt temperature of the sealant layer is 10° C. less than the melt temperature of the LDPE layer, or in the alternative, at least 20° C., or in the alternative, at least 30° C., or in the alternative, at least 50° C.

Examples

The following examples illustrate the present invention but are not intended to limit the scope of the invention.

Three multilayer structures were produced, Comparative Examples 1 and 2 and Inventive Example 1. Inventive Example 1 had a coextruded sealant layer. The sealant layer of Inventive Example 1 was 30 wt % ELITE 5220G and 70 wt % Polymer Blend 1. The sealant layer of Comparative Example 2 was 100% Polymer Blend 1 extrusion coated onto RELENE LDPE.

Comparative Example 1 is a three layer blown film of 20 micron made on a 3 layer blown film machine. The 3 layer film has 3 parts, Inner layer, middle (core) layer & Outer layer each of 6 micron. The 3 layer can be further described as follows: INNER layer (Sealing layer)=mLLDPE+LDPE–6.6 micron; MIDDLE (Core Layer)=mLLDPE+HDPE+LDPE–6.6 micron; and OUTER Layer=mLLDPE+LDPE–6.6 micron. The blown film was prepared on a Windmoller & Hollcher, 3 layer with 250 kg/hr and the following parameters/conditions: BUR of about 2; Die gap of 2.5 mm; Die Diameter of 350 mm; and Film Width of 950 mm.

RELENE LDPE 1070 LA17 is an extrusion coating grade low density polyethylene (LDPE) produced by high pressure autoclave process which is commercially available from Reliance Industries Limited (India).

ELITE 5220G is an ethylene/1-octene-based LLDPE having an $I_2$ of 3.5 g/10 min, and a density of 0.915 g/cc, (commercially available from The Dow Chemical Company).

Polymer Blend –1 is a blend comprising (i) from 80 to 95 percent by weight of at least one ethylene/α-olefin interpolymer composition which comprises a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and (ii) from 5 to 20 percent by weight of at least one high pressure ethylene polymer characterized as having a melt index, $I_2$ less than 6.0 g/10 minutes, a density of at least 0.916 g/cc, a Mw/Mn ratio of at least 7.0 and a bimodal molecular weight distribution as determined by gel permeation chromatography. Polymer Blend –1 has a density of 0.911 g/cc and an $I_2$ of 9 g/10 min.

The laminate examples had the following structure: Printed Oriented Polyester/Primer/Extrusion Lamination/Metalized PET/Primer/Sealant Layer. The laminate examples were prepared by extrusion coating the sealant layer on the substrate layers using the following conditions: SAM tandem (2 Stations) co-extruder; machine speed of: 120 meters/min; air gap of 165 mm; line width of 1050 mm, chill roll temperature of 10° C.; with corona treatment and a matte finish on the chill roll.

For Inventive Example 1, an RELENE LDPE 1070 LA17 was applied at a coating weight of 8 gsm and Polymer Blend −1 was applied at a coating weight of 18 gsm. 3 wt % slip additive (erucamide-based) was added into Polymer Blend −1. Each primer layer was applied at a 0.05 gsm coating weight.

The temperature (° C.) profile of the coextruder zones for Inventive Example 1 and Comparative Example 2 are shown in Table 1.

TABLE 1

| EXTRUDER | ZONE 1 (° C.) | ZONE 2 (° C.) | ZONE 3 (° C.) | ZONE 4 (° C.) | ZONE 5 (° C.) | ZONE 6 (° C.) | ZONE 7 (° C.) | ZONE 8 (° C.) |
|---|---|---|---|---|---|---|---|---|
| EXT. A (LDPE) | 180 | 280 | 295 | 310 | 320 | 320 | 320 | 320 |
| EXT B (Sealant Layer) | 180 | 260 | 275 | 280 | 285 | 285 | 290 | 290 |
| DIE | 300 | 300 | 300 | 305 | 305 | 305 | 305 | 305 |

Hot Tack and seal strength results are shown in Tables 2 and 3, respectively.

TABLE 2

| Temp ° C. | Comparative Example 1 (N/25 mm) | Comparative Example 2 (N/25 mm) | Inventive Example 1 (N/25 mm) |
|---|---|---|---|
| 90 | 0.3 | 0.7 | 0.33 |
| 100 | 1.24 | 4 | 4.6 |
| 110 | 5.6 | 5 | 6.4 |
| 120 | 9.2 | 3.7 | 5.1 |
| 130 | 6.6 | 2.7 | 3.8 |
| 140 | 5.3 |  | 3.4 |

TABLE 3

| Temp ° C. | Comparative Example 1 (N/25 mm) | Comparative Example 2 (N/25 mm) | Inventive Example 1 (N/25 mm) |
|---|---|---|---|
| 90 | 0.2 | 0 | 0 |
| 100 | 1.83 | 37 | 8.5 |
| 110 | 26.3 | 66.7 | 59.5 |
| 120 | 60 | 66.7 | 73 |
| 130 | 77 | 67 | 74 |
| 140 | 86 | 68 | 72 |

Table 4 provides the coefficient of friction (COF) information for each of Inventive Example 1 and Comparative Example 1.

TABLE 4

| COF | Comparative Ex. 1 | Inventive Ex. 1 |
|---|---|---|
| FILM TO METAL | Very Low | Very Low |
| FILM TO FILM | 0.13 | 0.19 |

Test Methods

Test methods include the following:
Polymer density is measured according to ASTM D792.
Melt index, $I_2$, is measured according to ASTM D-1238-10, condition 190° C./2.16 kg.

Heat Seal measurements on the film are performed on a commercial tensile testing machine according to ASTM F-88 (Technique A). The Heat Seal test is a gauge of the strength of seals (Seal Strength) in flexible barrier materials. It does this by measuring the force required to separate a test strip of material containing the seal and identifies the mode of specimen failure. Seal Strength is relevant to the opening force and package integrity. Seal strength was measured on a J&B Hot Tack tester, 4000 with a conditioning time of 24 hours, test speed of 200 mm/min, sample width of 25 mm, sealing pressure of 0.275 N/mm$^2$, and sealing time of 0.5 seconds.

Hot tack was measured on a J&B Hot Tack tester, 4000 with a conditioning time of 24 hours, test speed of 200 mm/min, sample width of 25 mm, sealing pressure of 0.275 N/mm$^2$, and sealing time of 0.5 seconds.

Coefficient of Friction is measured according to ASTM D-1894.

The present invention may be embodied in other forms without departing from the spirit and the essential attributes thereof, and, accordingly, reference should be made to the appended claims, rather than to the foregoing specification, as indicating the scope of the invention.

We claim:
1. An extrusion coated multilayer structure comprising:
a sealant layer which comprises
(a) a blend comprising
(i) from 80 to 95 percent by weight of at least one ethylene/α-olefin interpolymer composition which comprises a homogeneously branched linear ethylene polymer composition and a heterogeneously branched linear ethylene polymer composition, wherein the ethylene/α-olefin interpolymer is characterized as having a density in the range of 0.85 g/cc to 0.940 g/cc and
(ii) from 5 to 20 percent by weight of at least one high pressure ethylene polymer characterized as having a melt index, $I_2$, less than 6.0 g/10 minutes, a density of at least 0.916 g/cc, a Mw/Mn ratio of at least 7.0 and a bimodal molecular weight distribution as determined by gel permeation chromatography,
wherein the blend has a melt index, $I_2$, of at least 1.0 g/10 minutes; and
(b) a linear low density polyethylene composition which comprises at least two components selected from the group consisting of homogeneously and heterogeneously branched linear ethylene polymers, wherein the composition has a density from 0.86 to 0.940 g/cc and an $I_2$ of from 0.5 to 50 g/10 minutes;

a low density polyethylene (LDPE) layer consisting of a LDPE, the LDPE layer in direct contact with the sealant layer;

an oriented polyamide layer;

a barrier layer;

an extrusion laminate comprising a polypropylene;

a first primer contacting the oriented polyamide layer and the extrusion laminate; and a second primer between the barrier layer and the sealant layer and wherein the barrier layer is adjacent to the extrusion laminate and the sealant layer and the oriented polyamide layer are surface layers of the extrusion coated multilayer structure.

2. The extrusion coated multilayer structure of claim 1, wherein the sealant layer has a coating weight of at least 8 gsm.

3. The extrusion coated multilayer structure of claim 1, wherein the sealant layer is coextruded with the LDPE layer, wherein the LDPE has a coating weight of 5 to 15 gsm.

4. The extrusion coated multilayer structure of claim 1, wherein the sealant layer further comprises a slip agent.

5. The extrusion coated multilayer structure of claim 1 wherein, if the sealant layer is coated at an 8 gsm coating weight, the sealant layer exhibits at least one of the following properties: a hot tack strength of at least 3 N per inch and a seal strength of at least 20 N per inch.

6. A method for preparing an extrusion coated multilayer structure comprising:

coextrusion coating a sealant layer with a low density polyethylene (LDPE) layer onto a laminate, wherein the sealant layer comprises (a) a blend comprising (i) from 80 to 95 percent by weight of at least one ethylene/α-olefin interpolymer composition selected from the group consisting of a homogeneously branched linear ethylene polymer composition and a heterogeneously branched linear ethylene polymer composition, wherein the ethylene/α-olefin interpolymer is characterized as having a density in the range of 0.85 g/cc to 0.940 g/cc and (ii) from 5 to 20 percent by weight of at least one high pressure ethylene polymer characterized as having a melt index, $I_2$, less than 6.0 g/10 minutes, a density of at least 0.916 g/cc, a Mw/Mn ratio of at least 7.0 and a bimodal molecular weight distribution as determined by gel permeation chromatography, wherein the blend has a melt index, $I_2$, of at least 1.0 g/10 minutes; and (b) a linear low density polyethylene composition which comprises at least two components selected from the group consisting of homogeneously and heterogeneously branched linear ethylene polymers, wherein the composition has a density from 0.86 to 0.940 g/cc and an $I_2$ of from 0.5 to 50 g/10 minutes;

wherein the sealant layer is present in an amount from 8 to 30 gsm;

the LDPE layer consisting of a LDPE, the LDPE layer in direct contact with the sealant layer;

the laminate comprises:

an oriented polyamide layer;

a barrier layer;

an extrusion laminate comprising a polypropylene;

a first primer contacting the oriented polyamide layer and the extrusion laminate; and a second primer between the barrier layer and the sealant layer and wherein the barrier layer is adjacent to the extrusion laminate and the sealant layer and the oriented polyamide layer are surface layers of the extrusion coated multilayer structure.

7. The method for preparing the extrusion coated multilayer structure according to claim 6, wherein the LDPE layer is present in an amount from 5 to 15 gsm.

8. The method for preparing the extrusion coated multilayer structure of claim 7, wherein the melt temperature of the sealant layer is lower than the melt temperature of the LDPE layer.

9. A packaging comprising the extrusion coated multilayer structure of claim 1.

* * * * *